(12) United States Patent
Laurent

(10) Patent No.: US 6,851,246 B2
(45) Date of Patent: Feb. 8, 2005

(54) STRUCTURAL MEMBER COMPRISING A BODY AND REINFORCING RIBS AND CORRESPONDING MOTOR VEHICLE

(75) Inventor: Claude Laurent, Voujeaucourt (FR)

(73) Assignee: Faurecia Industries, Boulogne-Billancourt (FR)

(*) Notice: Subject to any disclaimer, the term of this patent is extended or adjusted under 35 U.S.C. 154(b) by 68 days.

(21) Appl. No.: 09/759,223

(22) Filed: Jan. 16, 2001

(65) Prior Publication Data

US 2001/0025462 A1 Oct. 4, 2001

(30) Foreign Application Priority Data

Jan. 17, 2000 (FR) .......................................... 00 00535

(51) Int. Cl.[7] .................................................. E04C 3/04
(52) U.S. Cl. .................... 52/731.6; 52/730.4; 52/731.1; 296/187.1; 296/146.6; 293/102
(58) Field of Search ................................ 296/188, 187, 296/189, 901, 146.6; 293/102; 280/800; 52/730.4, 730.2, 730.6, 731.6, 735.1, 309.7, 309.16, 729.2, 731.1; 428/595, 596, 598, 36.9, 180

(56) References Cited

U.S. PATENT DOCUMENTS

| | | | | |
|---|---|---|---|---|
| 1,604,151 A | * | 10/1926 | Dornier ...................... | 52/731.6 |
| 2,136,122 A | * | 11/1938 | Almdale ...................... | 52/735.1 |
| 3,448,550 A | * | 6/1969 | Herr et al. ................... | 428/180 |
| 3,739,882 A | * | 6/1973 | Schwenk et al. ........... | 280/800 |
| 3,758,703 A | * | 9/1973 | Golden et al. ............. | 174/84 C |
| 3,866,963 A | * | 2/1975 | Weller .......................... | 293/88 |
| 3,997,207 A | * | 12/1976 | Norlin ....................... | 293/71 R |
| 4,128,975 A | * | 12/1978 | Abate .......................... | 52/125 |
| 4,171,598 A | * | 10/1979 | Holmes ....................... | 52/118 |
| 4,273,836 A | * | 6/1981 | Campbell et al. ........... | 428/595 |
| 4,413,856 A | * | 11/1983 | McMahan et al. .......... | 296/188 |
| 4,580,380 A | * | 4/1986 | Ballard ...................... | 52/309.9 |
| 4,830,898 A | * | 5/1989 | Smith .......................... | 428/122 |
| 5,100,187 A | * | 3/1992 | Loren ......................... | 293/110 |

(List continued on next page.)

FOREIGN PATENT DOCUMENTS

| | | | | |
|---|---|---|---|---|
| EP | 370342 | * | 11/1989 | ................. 280/800 |
| EP | 440567 | * | 8/1991 | ................. 296/187 |
| EP | 654321 | * | 11/1994 | ................. 52/731.6 |
| EP | 888835 | * | 1/1999 | ................. 52/730.1 |
| EP | 967 138 | | 12/1999 | |
| GB | 2067478 | * | 7/1981 | ................. 428/180 |
| GB | 2196584 | * | 8/1987 | ............. 296/146.6 |
| GB | 2196584 | * | 5/1988 | ............. 296/146.6 |
| GB | 2331051 | * | 5/1999 | ................. 52/731.6 |
| JP | 220213 | * | 8/2000 | ................. 296/187 |

Primary Examiner—Lanna Mai
Assistant Examiner—Phi Dieu Tran A
(74) Attorney, Agent, or Firm—Sughrue Mion, PLLC

(57) ABSTRACT

A structural member (1) has a body (2) with a cavity (3), plastic reinforcing ribs (4) in the cavity (3), and structure (10, 12) for fixing the ribs (4) to the body. The fixing structure includes discrete regions (12), set back from at least one outer edge (11) of the body (2), and blocks (10) that are part of the same moulding as the ribs (4). The blocks (10) envelop the outer edge (11) in its set-back regions (12).

14 Claims, 3 Drawing Sheets

U.S. PATENT DOCUMENTS

| | | | | |
|---|---|---|---|---|
| 5,269,574 A | * | 12/1993 | Bhutani et al. | 293/102 |
| 5,302,466 A | * | 4/1994 | Davies et al. | 428/573 |
| 5,382,051 A | * | 1/1995 | Glance | 280/751 |
| 5,403,048 A | * | 4/1995 | Ekladyous et al. | 293/115 |
| 5,480,189 A | * | 1/1996 | Davies et al. | 280/797 |
| 5,579,699 A | * | 12/1996 | Dannawi et al. | 105/416 |
| 5,651,218 A | * | 7/1997 | Bright et al. | 49/490.1 |
| 5,715,757 A | * | 2/1998 | Dannawi et al. | 105/392.5 |
| 5,783,312 A | * | 7/1998 | Laughman et al. | 428/573 |
| 5,981,023 A | * | 11/1999 | Tozuka et al. | 428/105 |
| 5,997,057 A | * | 12/1999 | Gasko et al. | 293/102 |
| 6,165,588 A | * | 12/2000 | Wycech | 428/122 |
| 6,168,226 B1 | * | 1/2001 | Wycech | 296/146.6 |
| 6,237,304 B1 | * | 5/2001 | Wycech | 52/731.6 |
| 6,247,287 B1 | * | 6/2001 | Takabatake | 52/731.6 |
| 6,287,666 B1 | * | 9/2001 | Wycech | 428/122 |
| 6,298,622 B1 | * | 10/2001 | Cretti | 52/309.7 |
| 6,378,268 B1 | * | 4/2002 | Guyomard | 52/735.1 |

* cited by examiner

STRUCTURAL MEMBER COMPRISING A BODY AND REINFORCING RIBS AND CORRESPONDING MOTOR VEHICLE

BACKGROUND OF THE INVENTION

The invention relates to a structural member of the type comprising a body with a cavity, plastic reinforcing ribs in the cavity, and means for fixing the ribs to the body.

The invention applies particularly to motor vehicles in which members of the abovementioned type can be used, for example, as front faces, bumper beams, or door panels.

A member of this type is known from EP-0 370 342. In this member the ribs are fixed to the body using openings formed in the body, the plastic material of the ribs passing through these openings and projecting around them. Fixing can also be completed by molding the plastic material of the ribs onto reliefs formed on the inside of the body. However, it is a relatively complicated task to produce such a structural member, as the need for the elastic material to pass through openings distributed around the body makes the molds relatively complex, particularly if they are to be sufficiently leaktight.

SUMMARY OF THE INVENTION

An object of the invention is therefore to provide a structural member of the abovementioned type that can be produced more simply.

To this end, the subject of the invention is a structural member of the abovementioned type, characterized in that the fixing means comprise discrete regions set back from at least one outer edge of the body, and blocks that are part of the same molding as the ribs, which blocks envelop the outer edge in its set-back regions.

In accordance with certain particular embodiments, the structural member may include one or more of the following characteristics, taken in isolation or in all technically possible combinations:
 the set-back regions have stepped shapes with angles,
 the set-back regions have at least some parts that converge away from the body,
 the converging parts of the set-back regions are basically trapezium-shaped,
 the set-back regions are formed by cutouts in the body,
 the fixing means comprise discrete regions set back from two outer edges of the body on both sides of the cavity and blocks that are part of the same molding as the ribs and envelop the two edges in their set-back regions, and
 the body is made of metal.

The invention also relates to a motor vehicle fitted with a structural member as defined above.

BRIEF DESCRIPTION OF THE DRAWINGS

A clearer understanding of the invention will be gained from the following description which is provided purely by way of example and refers to the accompanying drawings, in which:

FIGS. 1 to 3 illustrate a structural member 1, designed for example to form an upper part of a front face of a motor vehicle.

Figure 1:
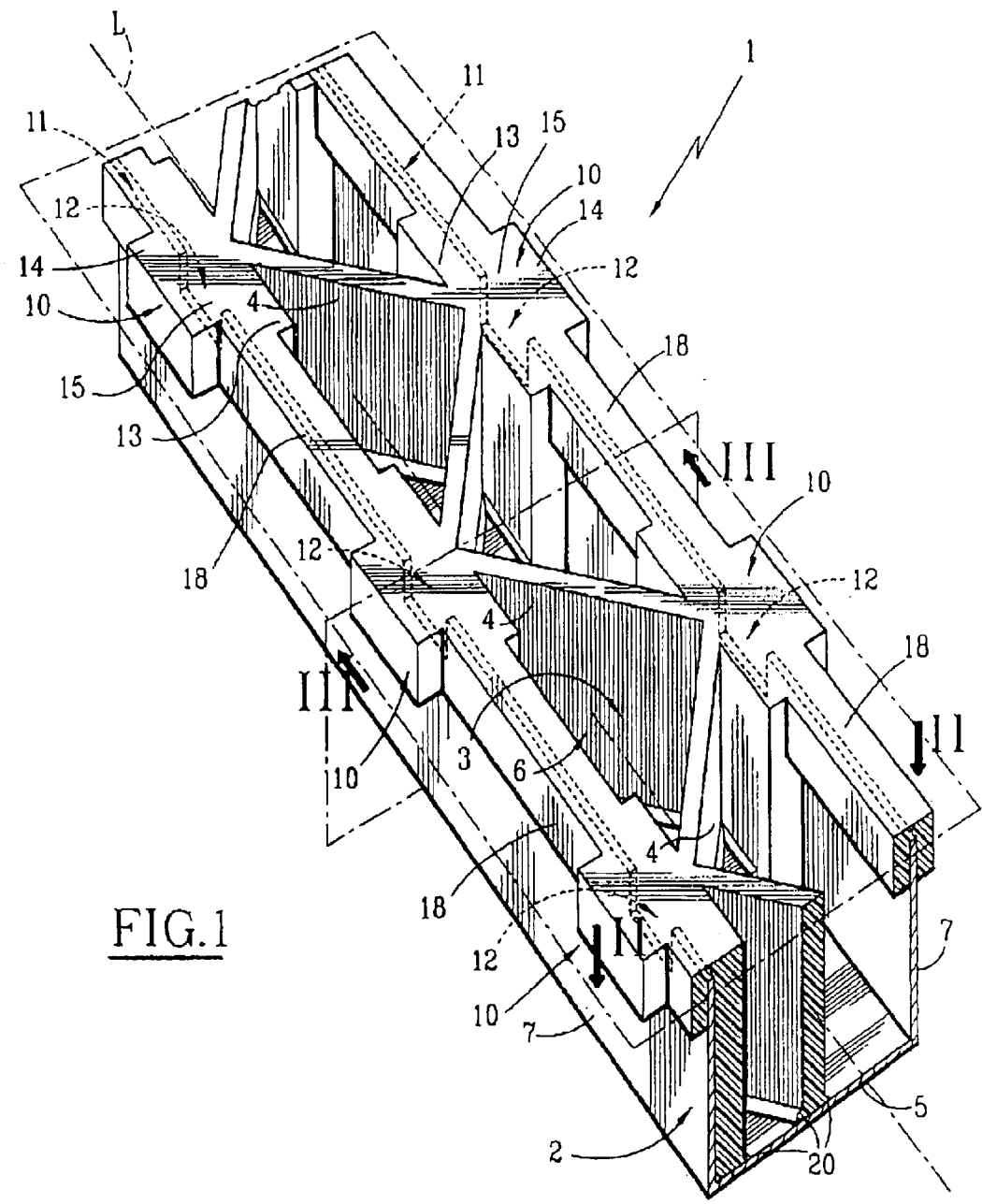
FIG. 1 is a partial schematic view of a structural member according to the invention.
Figure 2:
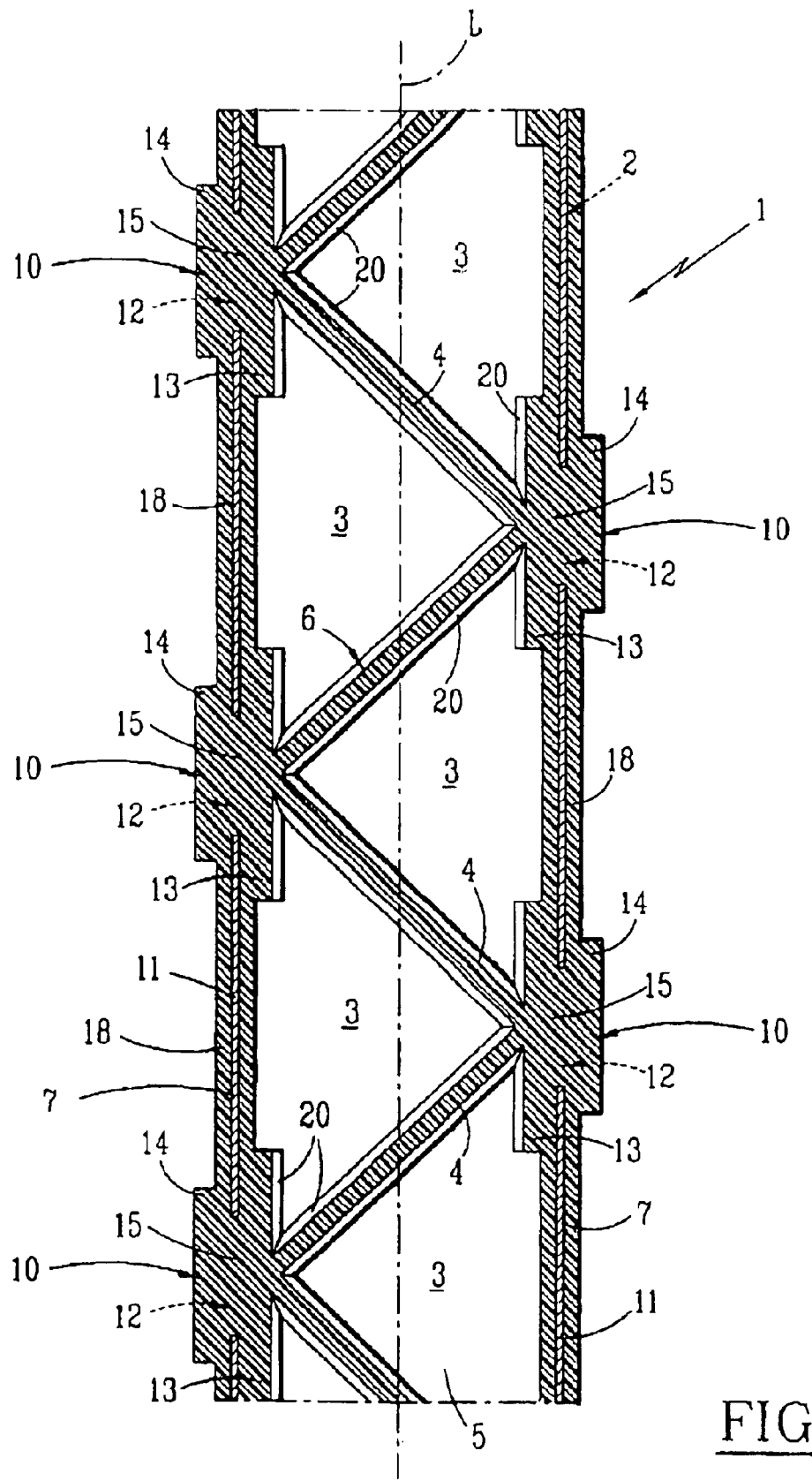
FIGS. 2 and 3 are partial schematic sectional views taken on planes II-II and III-III, respectively, shown in FIG. 1.
Figure 3:
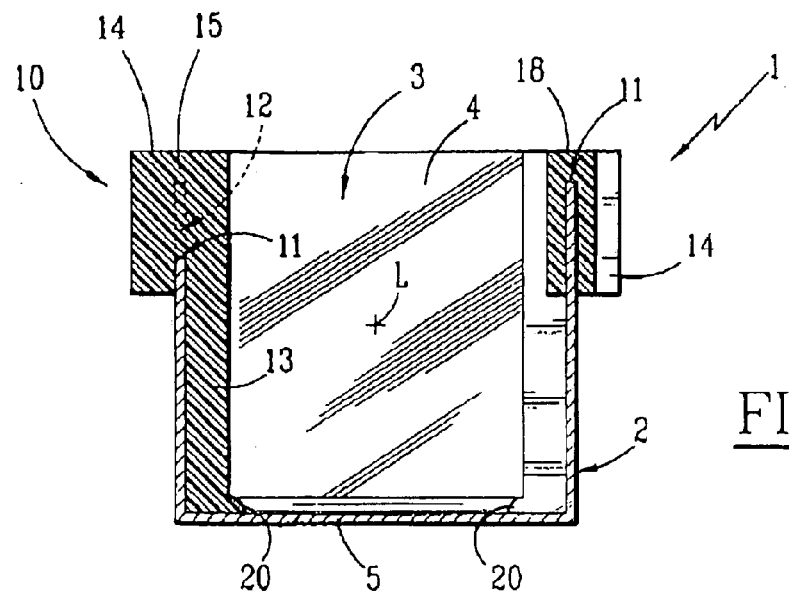

This member 1 is a length member comprising a concave base body 2 defining an internal cavity 3. More specifically, the body 2 shown is a metal channel section extending in a longitudinal direction L. The body 2 may have been produced by, for example, drawing a sheet of aluminium or other metal.

DETAILED DESCRIPTION OF THE INVENTION

The member 1 also comprises reinforcing V ribs 4, contiguous with each other and laid out, inside the cavity 3 on the web 5 of the body 2, one after the other along the direction L.

The ribs 4 are made up of the successive parts of a sheet 6 of a plastic material. The sheet 4 zigzags between the two side flanges 7 of the body 2. The plastic material of the sheet 4 may be polyamide or polypropylene.

The ribs 4 are connected rigidly to the body 2 by means of fixing blocks 10 that are part of the same molding as the ribs 4 and envelope the upper outer edges 11 of the flanges of the body 2 in the cutout 12 formed in the upper edges of the flanges 7.

Figure 4A:
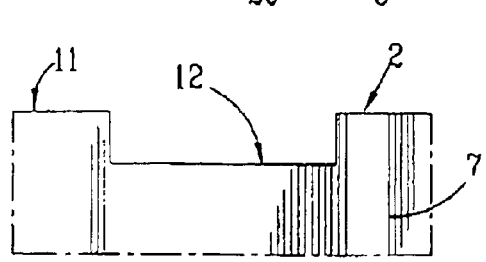
FIG. 4a is a schematic side view of a cutout in the body of the member shown in FIG. 1 and FIGS. 4b to 4e are views similar to FIG. 4a showing variants of the member of FIG. 1.

These cutouts 12 are identical and rectangular, as can be seen in FIG. 4a. These cutouts 12 therefore define discrete regions set back from the edges 11.

All the cutouts 12 of one edge 11 are at regular intervals from each other. The cutouts 12 alternate between the two edges 11 situated on either side of the cavity 3.

Each fixing block 10 envelopes the corresponding outer edge 11 for a slightly greater length than the corresponding cutout 12. More precisely, the block 10 in question comprises an essentially rectangular internal plate 13 extending inside the cavity 3 against the corresponding flange 7 over the whole height of the latter. The block 10 also has an external plate 14 whose dimensions are slightly greater than those of the cutout 12, but whose height and length are much less than those of the internal plate 13. This external plate 14 lies against the outside surface of the corresponding flange 7. The plates 13 and 14 are connected by a connecting part 15 that is part of the same molding as the plates 13 and 14 and extends through the cutout 12.

All the blocks 10 of either edge 11 are connected to each other by rails 1S that are part of the same molding as the blocks 10 connected to each other by rails 18 that are part of the same molding as the blocks 10 and envelope the edges 11.

The internal plates 13 of the blocks 10 and the ribs 4 possess enlarged lower parts 20 forming supporting feet on the web 5 of the body 2.

The blocks 10 are situated at each meeting point of the ribs 4.

The meeting points of the ribs 4 are part of the same molding as the blocks 19 in the central regions of the internal plates of the blocks 10. The ribs 4 are therefore supported laterally on the flanges 7 of the body 2 via the internal plates 13 of the blocks 10.

The structural member 1 can be produced by, for example, injection overmolding of the plastic material of the ribs 4, blocks 10 and rails 18 onto the body 2.

The structural member 1 is therefore light, relatively inexpensive and has good mechanical properties, notably a relatively high stiffness.

The ribs 4 are joined rigidly to the body 2 by fixing the blocks 10 to the edges 11 in the cutouts 12, without any need for other means of fixing it in areas of the body 2 other than its edges 11. In particular, there is no need to cut orifices in the web 5 and flanges 7 of the body 2 for the plastic material of the ribs 4 to pass through.

The structural member 1 can therefore be produced in relatively simple molds in which the only place where the plastic material must be allowed to pass through the walls of the body 2 is at the outer edges 11.

Additionally, the invention can be used to produce structural members in which the ribs 4 are fixed to the body 2 in an at least partly different way to that in EP 0 370 342.

The attachment of the plastic material in the body 2 can be done by means of cutouts 12 of shapes other than the shape shown in FIG. 4a.

Figure 4B:
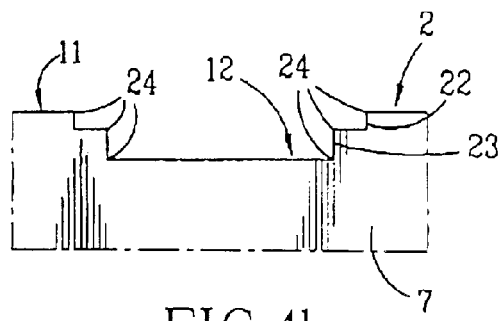

In the variant shown in FIG. 4b, the cutouts 12 are stepped so as to correspond to an upper rectangle 22 of greater length and a lower rectangle 23 of shorter length. The cutouts 12 are therefore roughly T-shaped. This variant improves the attachment of the blocks 10 to the flanges 7 because of the many angles 24 present in each cutout 12.

Figure 4C:
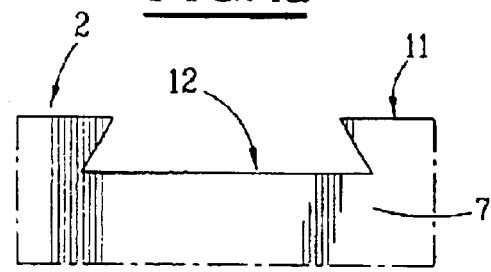

In the variant shown in FIG. 4c, each cutout 12 is basically in the shape of a re-entrant dovetail or trapezium. The cutouts 12 converge away from the body 2.

This variant also enhances the fixing of the ribs 4 to the body 2.

Figure 4D:
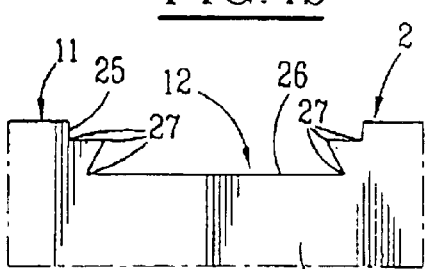

In the variant shown in FIG. 4d, each cutout 12 has a stepped shape corresponding to a longer upper rectangle 25 and to a shorter lower re-entrant dovetail or trapezium.

The attachment of the blocks 10 to the flanges 7 is improved by the many angles 27 of the cutouts 12 and by the fact that the trapezia 26 converge away from the body 2.

Figure 4E:
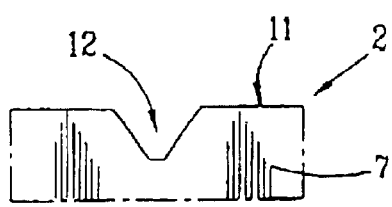

In the variant shown in FIG. 4e, the cutouts 12 are essentially V-shaped.

In other variants, the body 2 may be made of plastic rather than metal.

In yet another variant, the rails 18 are omitted.

More generally, the ribs 4 may be shaped differently—for example, X-shaped.

What is claimed is:

1. A structural member comprising a body with a cavity, and plastic ribs in the cavity, the body having at least one outer edge which comprises set back discrete regions, said regions defining notches which open in the outer edge, the member further comprising blocks that are integral moulded with the ribs, the blocks enveloping the outer edge in its set-back regions and extending through the notches, the ribs being rigid and reinforcing the body, wherein the body is a metal body that is partly enveloped in the blocks so that at least a part of the metal body is exposed.

2. The member according to claim 1, wherein the set-back regions have stepped shapes with angles.

3. The member according to claim 1, wherein the set-back regions have at least some parts that converge away from the body.

4. The member according to claim 3, wherein the converging parts of the set-back regions are substantially trapezium-shaped.

5. The member according to claim 1, wherein the set-back regions are formed by cutouts in the body.

6. The member according to claim 1, wherein the body has two outer edges on both sides of the cavity, the outer edges comprising set back discrete regions, said regions defining notches which open in the outer edges, the member further comprising blocks that are integral moulded with the ribs, the blocks enveloping the outer edges in their set-back regions and extending through the notches.

7. The member according to claim 1, characterized in that the body (2) is made from a sheet of metal.

8. A motor vehicle comprising a structural member according to claim 1.

9. A method for producing a structural member comprising the steps of:

providing a body with a cavity, said body having at least one outer edge which comprises set back discrete regions defining notches which open in the outer edge, and overmoulding plastic ribs in the cavity to cause blocks integral with the ribs to envelop the outer edge in its set back regions and extend through the notches so that the ribs are fixed with respect to the body, the ribs being rigid and reinforcing the body, wherein the body is a metal body that is partly enveloped in the blocks so that at least a part of the metal body is exposed.

10. A structural member comprising a body with a cavity, and plastic reinforcing ribs in the cavity, the body having at least two walls and one outer edge which comprises set back discrete regions, said regions defining notches which open in the outer edge, the member further comprising blocks that are integral moulded with the ribs, the blocks enveloping the outer edge in its set-back regions and extending through the notches, and the ribs being rigid, extending from one of said walls to another of said walls, and reinforcing the body, wherein the body is a metal body that is partly enveloped in the blocks so that at least a part of the metal body is exposed.

11. The member according to claim 10, wherein the set-back regions have at least some parts that converge away from the body.

12. The member according to claim 11, wherein the converging parts of the set-back regions are substantially trapezium-shaped.

13. The member according to claim 10, wherein the body has one outer edge on each of said walls, the outer edges comprising set back discrete regions, said regions defining notches which open in the outer edges, the member further comprising blocks that are integral moulded with the ribs, the blocks enveloping the outer edges in their set-back regions and extending through the notches.

14. The member according to claim 10, wherein said two walls are opposite walls.

* * * * *